United States Patent [19]

Jansen et al.

[11] Patent Number: 5,233,066

[45] Date of Patent: Aug. 3, 1993

[54] SILICON BORON NITRIDE CERAMIC AND PRECURSOR COMPOUNDS, A PROCESS FOR THEIR PREPARATION AND THEIR USE

[75] Inventors: Martin Jansen, Bonn; Hans-Peter Baldus, Burscheid; Oliver Wagner, Bonn, all of Fed. Rep. of Germany

[73] Assignee: Bayer Aktiengesellschaft, Leverkusen-Bayerwerk, Fed. Rep. of Germany

[21] Appl. No.: 840,158

[22] Filed: Feb. 24, 1992

[30] Foreign Application Priority Data

Mar. 6, 1991 [DE] Fed. Rep. of Germany ....... 4107108

[51] Int. Cl.$^5$ .............................. C07F 5/02; C07F 7/10
[52] U.S. Cl. .......................................... 556/402; 528/5
[58] Field of Search ............................ 501/96, 97, 98; 556/402; 528/5

[56] References Cited

U.S. PATENT DOCUMENTS

| | | | |
|---|---|---|---|
| 3,265,737 | 8/1966 | Miller | 556/402 X |
| 3,357,949 | 12/1967 | Horn et al. | 556/402 X |
| 4,707,556 | 11/1987 | Paciorek et al. | 556/403 |
| 5,118,774 | 6/1992 | Miguari | 556/402 X |
| 5,162,558 | 11/1992 | Ardaud et al. | 556/402 |

FOREIGN PATENT DOCUMENTS

| | | |
|---|---|---|
| 0310462 | 4/1989 | European Pat. Off. ............ 556/402 |
| 0389084 | 9/1990 | European Pat. Off. . |
| 0392941 | 10/1990 | European Pat. Off. . |

OTHER PUBLICATIONS

Nati Asi Ser., Ser. E, 141 (Transform. Organomet. Common Exot. Mater.), (1988), pp. 89–96; K. J. Wynne, pp. 93–95.

Primary Examiner—Paul F. Shaver
Attorney, Agent, or Firm—Connolly & Hutz

[57] ABSTRACT

Silicon boron nitride ceramics are produced from polyborosilizanes obtained from polymerized $Cl_3Si-NH-BClX$ wherein X is $-Cl$ or $-NH-Si-Cl_3$.

9 Claims, No Drawings

SILICON BORON NITRIDE CERAMIC AND PRECURSOR COMPOUNDS, A PROCESS FOR THEIR PREPARATION AND THEIR USE

The present invention relates to new trichlorosilylaminoboranes, new borosilazane compounds, new oligo or polyborosilazane compounds having the structural feature ≡Si—NH—B≡, a silicon boron nitride ceramic powder, ceramic material based on SiN and BN, a process for the preparation of these substances and the use of the polyborosilazanes and of the ceramic materials.

BACKGROUND OF THE INVENTION

Silicon nitride is a material which is basically very suitable for turbo superchargers, turbines of jet engines and linings of rocket jets and combustion chambers by virtue of its strength and its corrosion resistance.

For the above-mentioned uses, two factors play an important role in addition to the mechanical load bearing capacity and corrosion resistance at high temperatures, namely the resistance to thermal shock and the high temperature resistance. In the silicon nitride structures at present available, which contain about 10% by weight of oxidic sintering additives, the values of these important material data are still insufficient for high thermal stresses on account of the oxidic glass phases which form at the grain boundaries when sintering takes place.

According to U.S. Pat. No. 4,007,049, the thermal shock resistance is considerably improved by lowering the modulus of elasticity. This aim has in some cases been achieved by the preparation of composites. These diphasic composites consist of a ceramic material having a high modulus of elasticity, e.g. mullite or $Al_2O_3$, and a ceramic material with low modulus of elasticity, such as boron nitride (U.S. Pat. No. 4,304,870).

The mechanical properties of these composites are intermediate between those of pure components, i.e. the strength at room temperature decreases with increasing BN content in the present example and the thermal shock resistance increases correspondingly. In contrast to phase pure ceramics, no significant decrease in strength with increasing temperature is observed.

Similar results were obtained by Ruh et al (J.Am.-Ceram. Soc. 1981, 64, 415, Mater.Sci.Eng.71 (1985), 159-164) when they investigated hot pressed composites consisting of silicon nitride and boron nitride or silicon carbide and boron nitride. Both the modulus of elasticity and the strength at room temperature decrease with increasing BN content. The dielectric constant ϵ is decreased by the addition of boron nitride and the thermal shock resistance is improved, as was to be expected. In both cases, the components are left in the material as discrete phases after hot pressing at 1750° C. since the diffusion constants of these covalent compounds are negligibly small even when high pressures and temperatures are employed, and there is no solubility. In spite of careful homogenisation of the starting materials, therefore, microscopic inhomogeneities, which are partly responsible for the low strength of the composites, occur due to the random distribution of the primary particles in the ceramic parts.

One possible method of improving the homogeneity of such ceramics is described in EP-A-389 084, in which a soluble polyhydrosilazane is polymerised in an autoclave together with a soluble organic boron compound in a solvent.

The polyborosilazane obtained has a higher molecular weight than the original polysilazane due to the copolymerisation of the boron compound with the polysilazane. The copolymer is subsequently pyrolysed to form a boroncontaining ceramic powder. This process does not, of course, result in absolutely homogeneous distribution of boron in a silicon nitride ceramic since the polyhydrosilazane put into the process, which is a polymer, remains as a block during the reaction.

Another disadvantage is the narrow range of variation of the boron content in the ceramic since a starting polymer only has a small number of reactive centres compared with a monomer so that only a small amount of boron can be incorporated in the ceramic.

Compared with the desired ceramic which should consist only of silicon, boron and nitrogen, a ceramic produced according to EP-A-389 084 is composed at least of the elements silicon (about 40% by weight), boron (about 5% by weight), carbon (about 2% by weight), nitrogen (about 35% by weight) and oxygen (about 12% by weight). The relatively high proportion of oxygen is in the form of amorphous boron silicate glass. This glass has a deleterious effect on the high temperature strength and resistance to temperature changes of a ceramic body on account of its low softening point and relatively high coefficient of expansion.

A similar attempt in order to produce a homogeneous material consisting of boron, nitrogen and silicon is described in EP-A 424,082, in which a soluble polyhydridosilazane is reacted with a borane-lewis-base complex.

Because of the reasons already mentioned before, the polyborosilazane obtained by this method cannot be converted into a ceramic material with a homogeneous distribution of boron in a silicon nitride matrix.

Another disadvantage are the expensive starting materials required for this process.

It is an object of the present invention to provide novel organometlalic precursor compounds which can be produced easily and in high yields with low cost starting materials and a process for the production of nitridic ceramics consisting only of Si, B and N from these precursor compounds. Further, the process should ensure completely homogeneous distribution of the participating elements and be free from the disadvantages described above.

BRIEF DESCRIPTION OF THE INVENTION

These requirements are fulfilled by molecular disperse ceramics, their precursor compounds and the processes employed for the preparation of these substances. In particular polyborosilazanes are prepared from the reaction products of trichloro-trimethyldisilazane with $BCl_3$ and ceramics consisting essentially of bond sequences N—Si—N—B—N are prepared from the polyborosilazanes.

DETAILED DESCRIPTION OF THE INVENTION

It has now surprisingly been found that when 1,1,1-trichloro-3,3,3-trimethyldisilazane $CH_3Si$—NH—$SiCl_3$ (A) is reacted with $BCl_3$, two new compounds are formed, firstly, a trichlorosilylamino-dichloroborane $Cl_3Si$—NH—$BCl_2$ (I) and secondly, a bis-(trichlorosilylamino)-chloroborane $(Cl_3Si$—$NH)_2BCl$ (II). Both molecular compounds are characterised by a molecular silicon-nitrogen-boron bond. Both compounds are the subject matter of this invention.

Starting compound (A) can be prepared in a yield of over 90% from hexamethyldisilazane and silicon tetrachloride by stirring at room temperature.

For the preparation of (A), the molar ratio of hexamethyldisilazane to silicon tetrachloride is preferably from 1:10 to 4:1, preferably 1:5.

According to the invention, compounds (I) and (II) are obtained in 85% yield and 30% yield, respectively, by dropwise addition of compound (A) to $BCl_3$, which may be in solution in an inert organic solvent (n-hexane, toluene, dichloromethane). The molar ratios of boron trichloride to (A) used for the preparation of compound (I) are preferably from 5:1 to 1:1 and those used for the preparation of compound (I) are preferably from 1:2 to 1:5. The molar ratio of the reactants is preferably 3:1 for compound (I) and about 1:2 for compound (II). The reaction temperature may vary from $-100°$ C. to room temperature and is preferably $-78°$ C. The compounds (I) and (II) thus prepared can easily be converted into an N—Si—N—B—N ceramic powder by an ammonolysis reaction followed by pyrolysis. The ratio of silicon to boron in the Si—N—B—N ceramic powders according to the invention can be adjusted infinitely from 100:0 (pure silicon tetrachloride) to 50:50 (pure compound (I)) by mixing the liquid compounds $SiCl_4$ and/or hexachlorodisilazane with (I) and/or (II).

Any process of ammonolysis of silicon tetrachloride known from the literature may be used for the reaction with $NH_3$. This applied to the reaction with solid or liquid ammonia at low temperatures (U.S. Pat. No. 4,196,178), the reaction with gaseous ammonia in an organic solvent (U.S. Pat. No. 3,959,446) or the reaction with $NH_3$ by a high temperature reaction with elimination of hydrogen chloride (U.S. Pat. No. 4,145,224).

After removal of the ammonium chloride formed in the reaction by known methods such as sublimation or washing with liquid ammonia, a polymeric imide is obtained which still contains a large number of NH or $NH_2$ groups. According to the invention, this polymeric imide is subsequently calcined in a stream of nitrogen at temperatures from 600° C. to 1450° C., preferably from 950° to 1400° C. Argon, ammonia or other inert or reactive gases may be used as calcining gases in addition to nitrogen.

The amorphous ceramic material thus produced consists mainly of Si, N and B and may contain traces of Cl, H, C and O. According to the invention, it has a structure consisting of N—Si—N—B—N units. This is relatively inert to atmospheric oxygen so that it may be used as a ceramic powder for industrial purposes without further after treatment. Electron raster microscopic photographs confirm that the distribution of elements is completely homogeneous at least to the lateral dimension of 0.5 µm. Crystallisation of the amorphous material to an $Si_3N_4$/BN ceramic powder is carried out by a temperature treatment, preferably at 1450° to 2100° C. According to the invention, $Si_3N_4$ and BN crystallites are distributed completely homogeneously in this ceramic on a nanometer scale. The crystallite size of the primary particles is on average from 0.01 µm to 1 µm and is preferably from 0.1 µm to 0.7 µm. The surface area of the powder is from 5 to 100 $m^2/g$, depending on the temperature treatment, and is preferably from 8 to 30 $m^2/g$.

TGA measurements in a heliumatmosphere carried out on finely divided amorphous powders show that the decomposition of these powders into their elements begins at about 1600° C., which is about 200 degrees Centigrade higher than the onset of decomposition of pure amorphous silicon nitride powder of similar morphology, which begins to lose considerable quantities of nitrogen at 1350° C. This comparison underlines the special suitability of the silicon boron nitride ceramics according to the invention for high temperature uses.

Monomeric or oligomeric reaction products corresponding to the formula $(NRR')_3Si—NH—B(NRR')_2$ or $[—(NR)_2Si—NH—B(NR)—]_x$ in which R and R' may be identical or different and denote $C_1$-$C_6$-alkyl, hydrogen, phenyl or vinyl may be obtained by reacting compounds (I) and (II) with primary or secondary alkylamines or aromatic amines such as methylamine, ethylamine, dimethylamine or aniline. The monomeric or oligomeric units are characterised by the fact that the first coordination sphere of each silicon or boron atom consists only of nitrogen atoms. They may subsequently be converted into polymers by a temperature treatment or by cross-linking with ammonia.

The resulting polyborosilazanes according to the invention vary in consistency from slightly viscous via resinous to waxy up to the solid, crystalline state, depending on the nature of R and R' and the degree of polymerisation. Thermal cross-linking takes place by elimination of an amine group accompanied by linkage of new Si—N—B—N—, Si—N—Si—N— or B—N—B—N-bonds.

Cross-linking with ammonia takes place by substitution of an NRR' group or an NR group by an $NH_2$ or NH group which then undergoes further cross-linking. Both reactions may take place both in open and in closed systems (autoclave). The polymerisation temperature is from $-20°$ C. to 300° C. and the polymerisation time is from 5 minutes to 10 days.

The invention further relates to the use of the polyborosilazanes according to the invention for the production of ceramic material by pyrolysis in an inert or $NH_3$-containing atmosphere at temperatures from 800° to 2100° C., preferably at 1600° C. The ceramic yields of pyrolysis are from 65 to 80%.

The product of pyrolysis is a ceramic material consisting to an extent of over 98% of the elements Si, B, N and C. It may be obtained in an amorphous or crystalline form. The crystalline phases contain $Si_3N_4$, BN, SiC and $B_4C$.

Since the polyborosilazanes according to the invention are soluble in numerous organic solvents, they may be worked up in the form of a solution to produce suitable semifinished goods or shaped products such as fibres, films or coatings. The highly viscous to waxy polyborosilazanes may also be directly spun or moulded into shaped products.

The shaped products thus obtained may be subjected to a physical or chemical preliminary treatment (curing, crosslinking) to render the silazane infusible before pyrolysis is carried out.

The invention is described below with the aid of Examples which are not to be regarded as limiting the scope of the invention.

EXAMPLE 1

Preparation of
1,1,1-trichloro-3,3,3-trimethyl-disilazanes (A)

70 g of silicon tetrachloride (0.41 mol) and 12.5 g of hexamethyldisilazane (0.08 mol) were brought together in a 250 ml three-necked flask and stirred at room temperature for 20 hours. Subsequent fractional distillation in a short Vigreux column yielded 16.2 g (92%) of 1,1,1-trichloro-3,3,3-trimethyldisilazane as a colourless liquid.

Bp.: 70° C./35 torr, $^1$H-NMR (ClCl$_3$)$\delta$=0.21 ppm, MS (EI) m/z =218 amu (M+).

EXAMPLE 2

Preparation of N-(trichlorosilylamino)-dichloroborane(I)

163 g (1.39 mol) of boron trichloride were condensed in a 500 ml three-necked flask at −5° C. 162.5 g of 1,1,1-trichloro-3,3,3-trimethyldisilazane were then slowly added dropwise (1 drop per second) with vigorous stirring at about 0° C. to −5° C. Stirring was continued for about one hour at 0° C. after all the disilazane had been added and the reaction mixture was then slowly heated to room temperature. The cloudy fluid was fractionally distilled. 144.4 g (86%) of Compound (I) was obtained at 35° C. and 8 mbar as a clear liquid which was very sensitive to hydrolysis.

MS(EI)m/z=229(M+),$^1$H-NMR(TMS,CDCl$_3$),$\delta_{N-H}$=5.15 ppm, $^{11}$B-NMR(BF$_3$*Et$_2$O)$\delta_B$=36ppm,$^{29}$Si—NMR(TMS$\delta_{Si}$=−23 ppm.

EXAMPLE 3

Preparation of bis-(trichlorosilylamino)-chloroborane(II)

Compound II was prepared by a method analogous to that used for the preparation of Compound (I) (Example 2) but with a reversed molar ratio of Compound (A) to boron trichloride.

41 g (0.35 mol) of boron trichloride were condensed in a 250 ml three-necked flask in a normal reaction mixture. 155 g (0.7 mol) of Compound (A) were then added dropwise at a rate of one drop per second at a temperature of about 0° C. The subsequent reaction and working up of the reaction product were carried out as described in Example 2. 36 g (30%) of (II) distilled over at a pressure of 0.1 mbar and a temperature of 26° C. in the form of a clear liquid which was very sensitive to hydrolysis.

MS(EI)m/z=342 (M+),$^1$H—NMR(TMS,CDCl$_3$)-$\delta_{N-H}$=4.15 ppm, $^{11}$B—NMR(BF$_3$*etherate)$\delta_B$=30ppm,$^{29}$Si—NMR(TMS)$\delta_{Si}$=−27 ppm.

EXAMPLE 4

Ammonolysis of trichlorosilylamino-dichloroborane(I)

200 ml (9 mol) of liquid ammonia (99.999%) were condensed in a 500 ml three-necked flask. 50 g of compound (I) (0.22 mol) were then slowly added dropwise (1 drop/second) with vigorous stirring at a temperature of −78° C. The suspension of imide, NH$_4$Cl and liquid ammonia was then stirred for about one hour to ensure that as much ammonium chloride as possible dissolves in the ammonia. After filtration, the residue was washed 10 to 20 times with liquid ammonia until a sample of the imide decomposed in water produced no more cloudiness when silver nitrate was added.

EXAMPLE 5

Ammonolysis of a mixture of hexachlorodisilazane (Cl$_3$Si—NH—SiCl$_3$) and trichlorosilylamino-dichloroborane(I)

200 ml (9 mol) of liquid ammonia (99.999%) were condensed in a 500 ml three-necked flask. A mixture of 5 g of compound (I) (0.022 mol) and 62 g (0.22 mol) of hexachlorodisilazane was then slowly added dropwise (1 drop per second) with vigorous stirring at a temperature of −78° C. This corresponds to an (Si:B) ratio of 10:1.

The suspension of polymeric imide, NH$_4$Cl and liquid ammonia was then stirred for about one hour to ensure that as much ammonium chloride as possible dissolved in the ammonia. After filtration, the residue was washed 10 to 20 times with liquid ammonia until a sample of the imide which had decomposed in water showed no more cloudiness when silver nitrate was added.

EXAMPLE 6

Preparation of a borosilazane compound 100 ml of methylamine were condensed at −78° C. in an evacuated 500 ml three-necked flask equipped with a 500 ml dropping funnel and without pressure equalization tube. 10 g (43.7 mmol) of Compound (I) dissolved in 250 ml of petroleum ether were then added with vigorous stirring at such a rate that the reaction temperature did not rise above −20° C. The solid, which consisted substantially of methylamine hydrochloride, was filtered off with a reversal frit. The solvent was removed from the clear less, viscous oil remained behind (7 g).

$^1$H—NMR $\delta_{NHC3}$=2.1 ppm, intensity: 10; $\delta_{NH}$=0.2 ppm, intensity: 2;

$^{11}$B—NMR: $\delta$=24.4 ppm,$^{29}$Si—NMR: $\delta$=−38 ppm, $^{13}$C—NMR: $\delta_{CH3}$=27.8 ppm IR:3420 cm$^{-1}$-(NH-stretching vibration),2870 cm$^{-1}$,2800 cm$^{-1}$, (CH-stretching vibration),1400 cm$^{-1}$, 1,1100 cm$^{-1}$,800 cm$^{-1}$.

EXAMPLE 7

Preparation of a polyborosilazane 5 g of oil obtained according to Example 6 were heated to 50° C. under a protective gas in a 50ml flask. Gaseous ammonia was then passed through the liquid at the rate of ml/min. A highly viscous, waxy, glass-clear polymer was obtained within 2 hours.

As the methylamino groups had been partially replaced by imide groups, the intensity of the CH bands in the IR spectrum of this polymer was considerably less than the intensity of the CH bands of the compound in Example 6 while the intensity of the NH bands significantly increased.

This polymer was then pyrolysed under nitrogen at 1000° C. A black powder having a carbon content of 10.4% was obtained. The yield of ceramic material was about 70%.

EXAMPLE 8

Conversion of an imide obtained according to Example 4 or 5 into an amorphous Si-N-B-N ceramic powder or a crystalline Si$_3$N$_4$/BN composite powder.

The polymeric imide obtained according to Example 4 was heated to 900° C. in a stream of ammonia in a tubular furnace and tempered at this temperature for about 30 minutes to drive off any traces of NH$_4$Cl still present. The material was then heated in a stream of nitrogen to raise the temperature to 1300° C. at the rate of 10 degrees Centigrade per minute and was calcined in the tubular furnace for a further two hours.

Since the polymeric imide had been completely converted into a nitridic ceramic, the IR spectrum of the treated material showed no NH bands. The powder obtained remained radiographically amorphous. The surface area was 45 m²/g.

Conversion of the amorphous Si—N—B—N ceramic powder into a crystalline Si₃N₄/BN composite with BN particles distributed microscopically uniformly in a silicon nitride matrix was carried out by 10 hours' tempering at 1850° C. The surface area of this powder was then 15 m²/g.

Analysis of a composition according to Example 4:
Si 39.5% by weight, N 45.1% by weight, Cl 0.05% by weight,
B 14.9% by weight, 0 0.3% by weight.

Analysis of a composition according to Example 5:
Si 52.0% by weight, N 44.7% by weight, Cl 0.01% by weight,
B 2.1% by weight, O 1.2% by weight.

What is claimed is:

1. Trichlorosilylamino-boranes having the formula

wherein X is —Cl or —NH—Si—Cl₃.

2. A process for the preparation of trichlorosilylamino-boranes claimed in claim 1 which comprises reacting 1,1,1-trichloro-3,3,3-trimethyldisilazane with BCl₃ at temperatures of from −50° C. to 50° C. and then fractionating the reaction mixture.

3. A process for the preparation of Cl₃Si—NH—BCl₂ as claimed in claim 2 wherein the ratio of 1,1,1-trichloro-3,3,3-trimethyldisilazane to boron trichloride is from 1:1 to 1:10.

4. A process for the preparation of Cl₃Si—NHBClNH—Si—Cl₃ as claimed in claim 2 wherein the ratio of 1,1,1,-trichloro-3,3,3-trimethyldisilazane to boron trichloride is from 1.5:1 to 10:1.

5. Boron silazane compounds of the formula

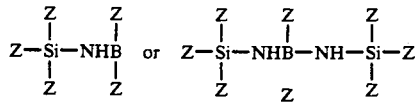

wherein Z is —Cl or —NRR' with the proviso that at least one Z is —NRR' wherein R and R' are the same or different and each is hydrogen, C₁-C₆-alkyl, phenyl or vinyl.

6. A process for the preparation of the compounds claimed in claim 5 which comprises reacting borosilazane compounds of the formula Cl₃Si—NH—BCl₂ or Cl₃Si—NH—BCl—NH—SiCl₃ with at least 10 mol of an organylamine per mol of borosilazane in a solvent at temperatures of from 80° C. to 300° C.

7. Oligo- or polyborosilazane compounds which obtained by subjecting borosilazane compounds according to claim 5 to thermal polymerization or to reaction with ammonia in open or closed systems under normal pressure or elevated pressure at temperatures of from −20° C. to 300° C.

8. Oligo- or polyborosilazane compounds containing repeating structural units ≡Si—NH—B≡, wherein the first coordination sphere of each silicon or boron atom consists only of nitrogen atoms which are substituted by a group R wherein R is H, C₁-C₆-alkyl, vinyl or phenyl.

9. Oligo- or polyborosilazane compounds claimed in claim 8 obtained by reacting compounds of the formula Cl₃Si—NH—BCl₂ or Cl₃Si—NH—BCL—NH—SiCl₃ with organylamino compounds R₂NH or RNH₂, wherein R denotes C₁-C₆-alkyl, vinyl or phenyl.

* * * * *

UNITED STATES PATENT AND TRADEMARK OFFICE
CERTIFICATE OF CORRECTION

PATENT NO. : 5,233,066
DATED : August 3, 1993
INVENTOR(S) : Martin Jansen, et al It is certified that error appears in the above-indentified patent and that said Letters Patent is hereby corrected as shown below:

Column 8, line 33, "BCL" should be --BC1--.

Signed and Sealed this

Fifteenth Day of March, 1994

Attest:

BRUCE LEHMAN

Attesting Officer

Commissioner of Patents and Trademarks